Oct. 5, 1965    ISAO OMOTEHARA ETAL    3,209,737
VALVE OPERATING DEVICE FOR INTERNAL COMBUSTION ENGINE
Filed June 21, 1963                 4 Sheets-Sheet 1
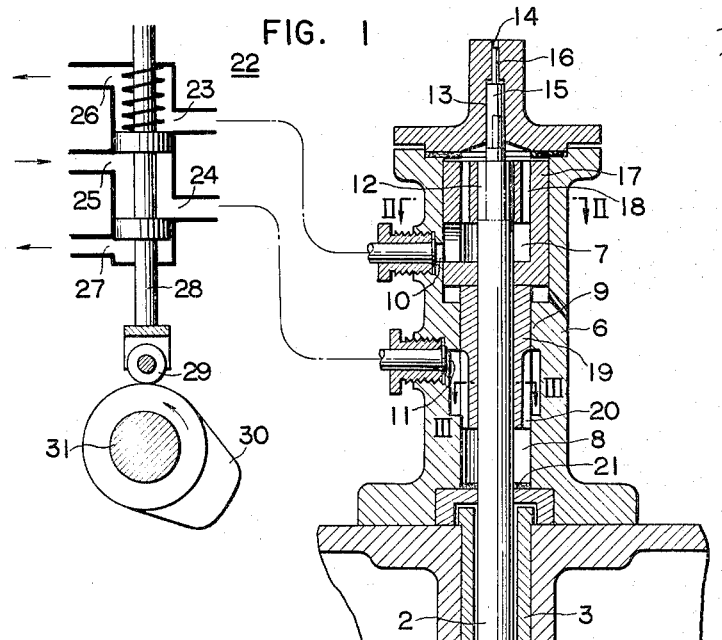
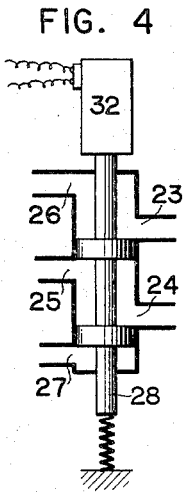
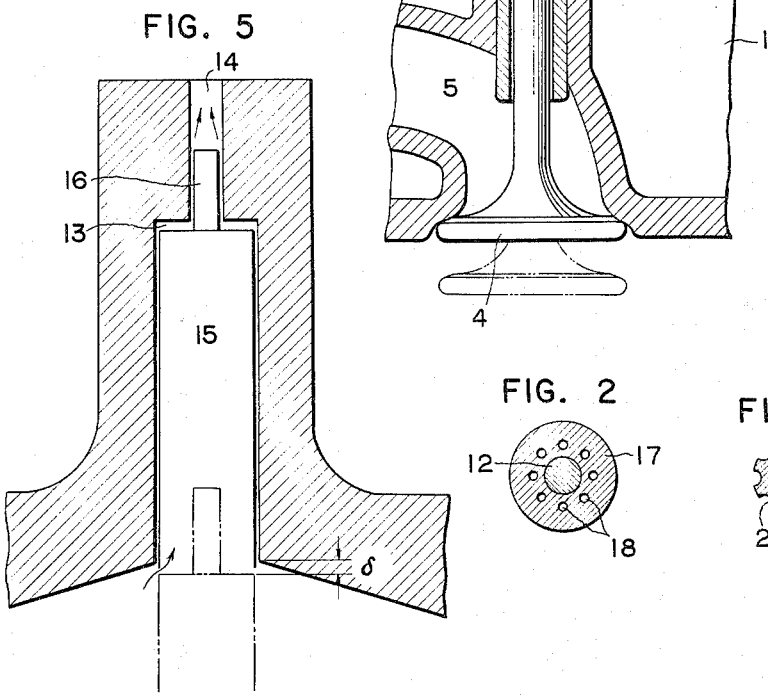
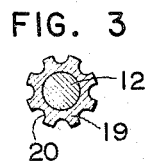

Oct. 5, 1965  ISAO OMOTEHARA ET AL  3,209,737
VALVE OPERATING DEVICE FOR INTERNAL COMBUSTION ENGINE
Filed June 21, 1963  4 Sheets-Sheet 3
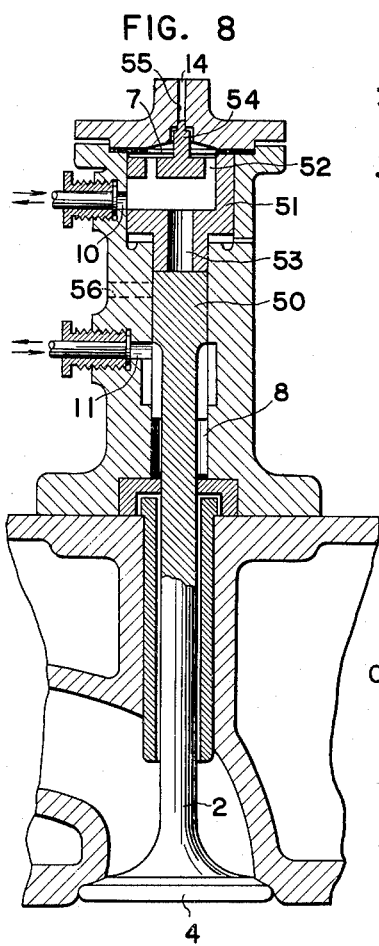
FIG. 8
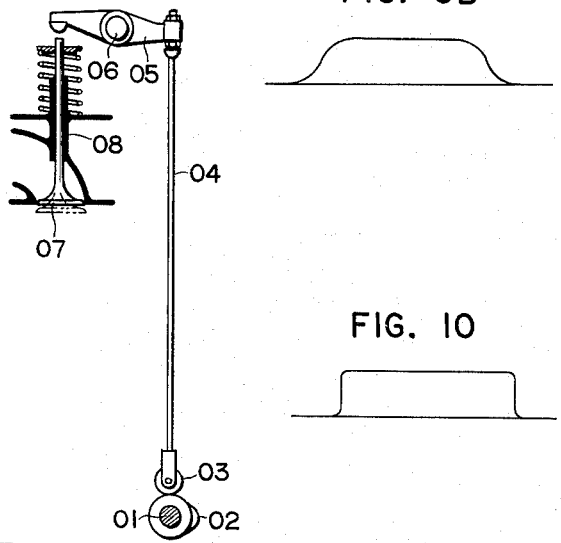
FIG. 9A
FIG. 9B
FIG. 10
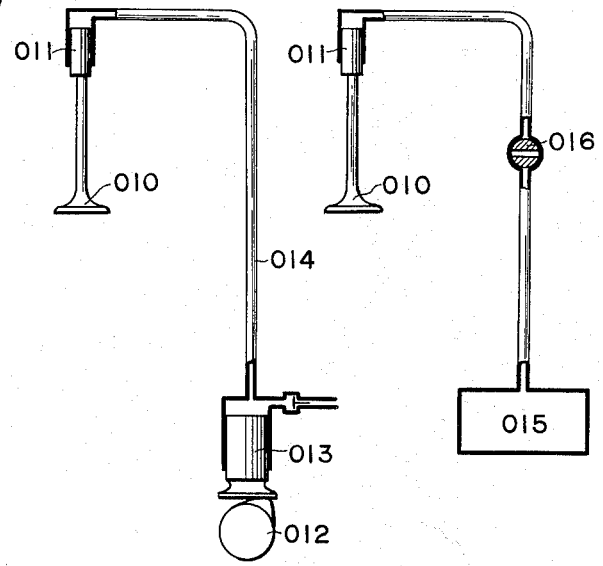
FIG. 11A
FIG. 11B FIG. 12A
FIG. 12B
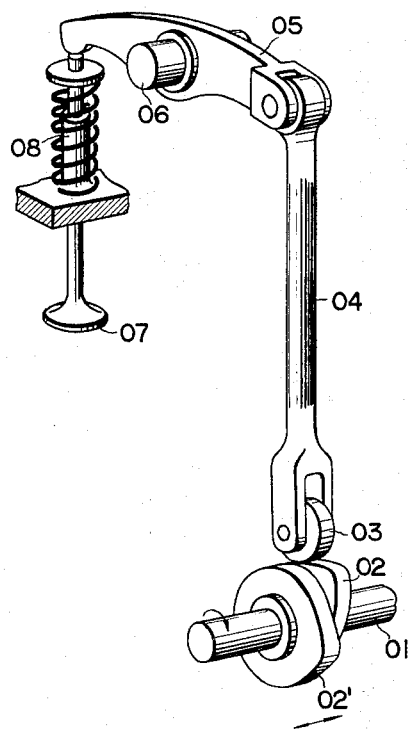
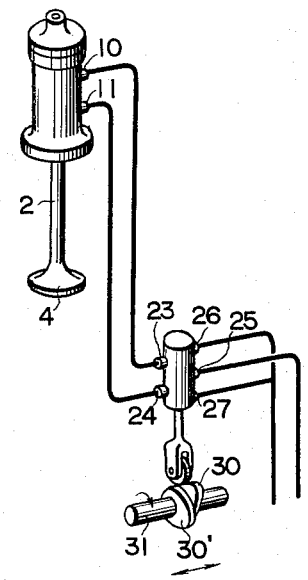

United States Patent Office 3,209,737
Patented Oct. 5, 1965

3,209,737
VALVE OPERATING DEVICE FOR INTERNAL COMBUSTION ENGINE
Isao Omotehara and Takeo Yoshida, Nagasaki, Nagasaki Prefecture, Japan, assignors to Mitsubishi Shipbuilding & Engineering Company, Limited, Tokyo, Japan
Filed June 21, 1963, Ser. No. 289,572
Claims priority, application Japan, June 27, 1962, 37/26,850
5 Claims. (Cl. 123—90)

This invention relates to a valve operating device for opening and closing an inlet valve, an exhaust valve or the like used with an internal combustion engine and more particularly to such a device for controlling operation of an exhaust valve equipped on a two-cycle diesel engine of supercharging type.

In the two-cycle diesel engine of supercharging type it has been commonly practiced to drive an exhaust gas turbine by an exhaust gas from the engine to drive a blower by the non driven gas turbine to thereby provide air in a predetermined amount and under a predetermined pressure necessary for supercharging and scavenging engine cylinders. In such an engine, an increase in its output per unit volume of an engine cylinder and a decrease in fuel consumption can be effected by causing a larger amount of air to exist in the engine cylinder having a predetermined volume at the instant the associated piston starts to effect compression, or by effecting higher supercharging. This means that the realization of supercharging higher than that would be heretofore possible enables to decrease a weight of and a space occupied by an engine and to reduce its operating costs for a given output of the same. Thus the realization of such supercharging has an extremely important significance in the field of diesel engines used with vehicles and ships.

To supercharge the aforesaid type of supercharging internal combustion engines to a greater extent than that would be previously possible many difficulties have been encountered in conjunction with the constructions and materials of various engine parts and the like. Among them technical difficulties which can hardly be eliminated have arisen in valve operating devices. More specifically, since a higher output engine is generally rotated at a higher rate than a lower output engine an interval of time that permits an inlet and an exhaust valve for an engine and in particular the later valve to be open within one cycle of operation (or an interval of time beginning at an instant the valve starts to be opened and terminating at an instant the same has been closed) is decreased with an increase in the number of rotations of the engine. On the other hand, in order to charge, as compared with the prior art practice, a large amount of air into the engine cylinder at the instant the associated piston has started to compress a charged air within the cylinder with the associated exhaust valve closed, it is required to increase the pressure of the charged air fed into the cylinder when an inlet valve was in its open state. This imposes a higher burden upon a blower driven by an exhaust gas turbine.

In order to obtain a larger amount of compressed air under a higher pressure by using an exhaust gas of fixed energy provided by the exhaust gas turbine, it is, of course, necessary that the performance of both the exhaust gas turbine and the blower be improved. However, before this improvement will be made it is essential to introduce the energy of the exhaust gas supplied from the engine cylinder into the exhaust gas turbine during the exhaust and scavenging periods with a minimum loss but with a maximum efficiency. To this end, a valve operating device and more particularly an exhaust valve should be more reasonably operated. In other words, some special design consideration must be, of course, paid to the configuration and volume of an exhaust passage extending from the exhaust valve to the exhaust gas turbine. In addition, it is extremely important to decrease a loss of energy in an exhaust gas spouted from the exhaust valve at the beginning of a period of time during which the exhaust valve is opened. This importance will readily be understood from the fact that the exhaust gas spouted from the engine cylinder through the associated exhaust valve when the latter started to be open has its energy corresponding to the greater part of the effective energy of the same available by the exhaust gas turbine. To decrease such energy loss it is necessary to increase the cross-sectional area of the exhaust passage and hence of the exhaust valve and/or to increase a speed at which the valve may be opened.

However, the two-cycle internal combustion engine of supercharging type as above described and more particularly an internal combustion engine of the type including on its engine cover an appropriate number of poppet type exhaust valves is provided on the engine cover with a multiplicity of openings into which, in addition to the exhaust valves, fuel injection valves, starting valves, valves for pressure indicators, safety valves etc. are fitted. Further, the engine includes exhaust passages through which the exhaust gas passing through the exhaust valves is discharged to the exterior, cooling water pipes and the like formed on the inside of the engine cover. Thus even any internal combustion engine moderately supercharged includes usually exhaust valves having already occupying the total of maximum space that may be provided therefor. Accordingly, the space provided for the exhaust valves can be very difficult to increase in order to effect supercharging. Therefore, it is very desirable to improve a valve operating device so as to increase a speed at which the exhaust valve is opened particularly when the same starts to be open whereby a loss of energy in the exhaust gas as spouted from the associated engine cylinder is minimized.

Accordingly, an object of the invention is to provide an improved valve-operating device capable of opening a valve used with an internal combustion engine at a high speed.

Another object of the invention is to provide an improved valve-operating device for an internal combustion engine of highly supercharging type very simple in construction and having a light weight and a small dimension.

A more specific object of the invention is to provide an improved valve-operating device capable of opening an exhaust valve used with an internal combustion engine of highly supercharging type at a high speed particularly at the beginning of a period of time during which the valve is opened and maintaining the valve at the high speed up to the end of the period of time.

Another object of the invention is to provide an improved valve-operating device for an internal combustion engine of highly supercharging type capable of rendering the operation of the engine smooth and quiet.

According to the invention there is provided a valve operating device for an internal combustion engine comprising a plunger member connected to a valve stem of either an exhaust or inlet valve and having a relatively small fluid pressure-bearing area, a piston member disposed coaxially to said plunger member and having a fluid pressure-bearing area larger than that of the plunger, the piston having a length of its stroke smaller than that of said plunger member, at least one pressure chamber for accommodating said plunger member and said piston member therein, a source of operating fluid under pressure, control valve means for introducing an operating fluid under pressure from said source into said pressure chamber therethrough in accordance with operation of the engine, and means for actuating either said piston member or the same and said plunger member by said operating fluid under pressure on a first part in a period of time during which the valve is opened, thereby to open the valve and actuating only said plunger member on the latter part of said period of time until the valve is fully opened.

Preferably the valve operating device may comprise hydraulic means for closing the valve comprising a second pressure chamber disposed adjacent to said pressure chamber and including inserted thereinto said plunger member or a second piston member connected in fixed relationship to said plunger member.

The valve operating device may advantageously comprise hydraulic buffer means including a small space formed on the top of said pressure and a protrusion disposed on the top of said piston member of said plunger member and adapted to be fitted into said small space upon opening the valve.

The invention will become more readily apparent from the following detailed description taken in conjunction with the accompanying drawings in which:

FIG. 1 shows a longitudinal sectional view of a valve operating device constructed in accordance with the teachings of the invention;

FIG. 2 shows a fragmental section taken along the line II—II of FIG. 1;

FIG. 3 shows a fragmental section taken along the line III—III of FIG. 1;

FIG. 4 shows diagrammatically a modification of a drive for driving a control valve in the device illustrated in FIG. 1;

FIG. 5 shows diagrammatically a fragmental sectional view, in enlarged scale of portions near a top of a first pressure chamber in the device illustrated in FIG. 1;

Figure 6A:
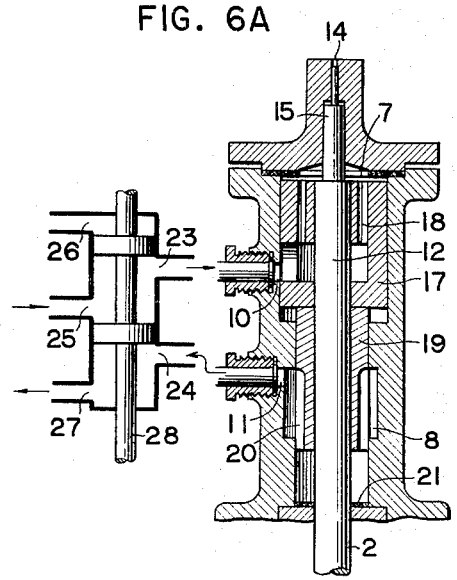
Figure 6B:
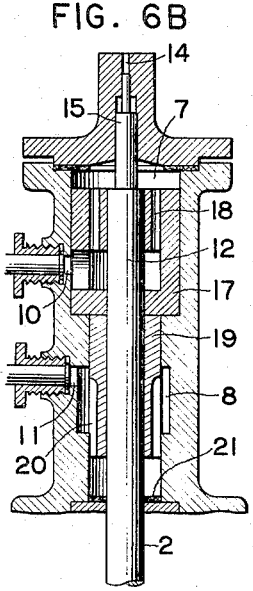
Figure 6C:
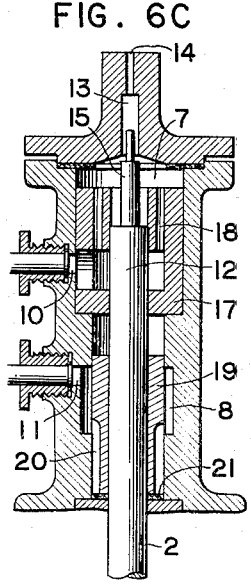
Figure 7A:
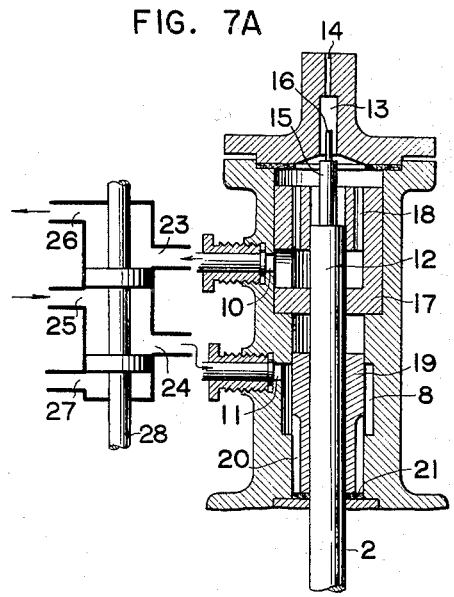
Figure 7B:
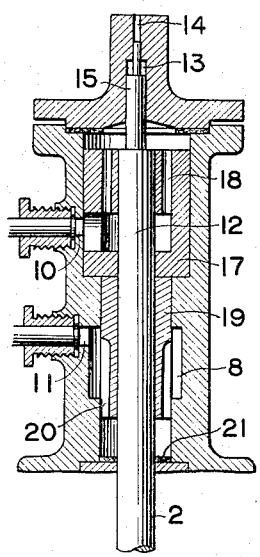
Figure 7C:
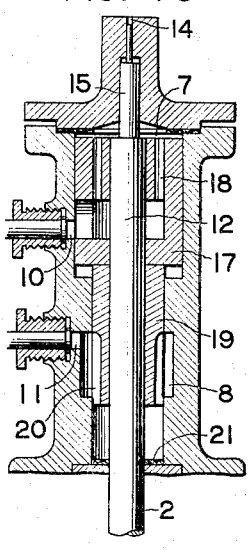

FIGS. 6A, B and C show a manner in which a valve used with the device of FIG. 1 is opened. FIG. 6A shows the valve at the instant the control valve has switched; FIG. 6B shows the valve being opened and FIG. 6C shows the valve after the completion of opening;

FIGS. 7A, B and C show a manner in which the valve illustrated in FIG. 6 is closed. FIG. 7A shows the valve at the instant the control valve has switched. FIG. 7B shows the valve being closed, and FIG. 7C shows the valve after the completion of closing;

FIG. 8 shows a longitudinal sectional view of another form of a valve operating device embodying the teachings of the invention;

FIG. 9A shows diagrammatically a view of a prior art device for mechanically operating a valve;

FIG. 9B shows a graph illustrating the time-to-aperture area characteristics of the device illustrated in FIG. 9A;

FIG. 10 shows a graph illustrating the time-to-aperture area characteristics provided by the invention;

FIGS. 11A and B show diagrammatically fluid pressure driven devices for operating valves in accordance with the teachings of the prior art; and FIGS. 12A and B show respectively perspective views of a conventional device for mechanically operating a valve and the valve operating device according to the teaching of the invention for the purpose of comparison.

To aid in understanding the invention the typical form of the conventional valve-operating devices widely used with internal combustion engines will now be described. As diagrammatically shown in FIG. 9A and also as shown in perspective in FIG. 12A a valve operating device of the prior art type may comprise a cam shaft 01 operatively coupled to a crank shaft (not shown) and a cam 02 mounted on the cam shaft 01 and engaging a roller 03. The cam 02 is adapted to effect vertically reciprocal movement of a push rod 04 through the roller 03 which movement, in turn, effects rocking movement of a valve lever 05 pivoted at its fulcrum 06 about the same. An exhaust valve 07 is operatively connected to the valve lever 05 and slidably carried in a valve-stem guide 08. Thus it will be appreciated that the cam 02 when driven effects opening and closing of the exhaust valve 07.

If such a device is incorporated into an internal combustion engine highly supercharged then an increase in number of rotation of the crank shaft causes inevitably the cam 02 to increase in its speed of rotation and therefore a period of time provided for opening and closing the associated valve is decreased. Further, it is necessary to drive the valve at a very high speed at which the same is opened, particularly on a first part of its opening period. For this reason, the cam imparts inevitably to its follower a very high acceleration. In addition, the total mass of the follower or roller 03, the exhaust valve 07 and their associated components is considerably large. It will be understood that the total mass of members for operating a valve such as an exhaust valve is very large particularly in a large-sized marine engine. Therefore, the moving parts are subjected to high impacts or shocks resulting in damage, non-smooth operation, great local wears etc. However, any valve operating device can be extremely difficult to be designed so as to be free from such drawbacks.

On the other hand, if the cam 02 is attempted to be modified in configuration to be prevented from suddenly changing the acceleration of the associated components then a lift curve for the valve will have a gentle slope and a "time-to-aperture area" curve for the same is particularly low at both the beginning of its opening period and the end of its closing period as shown in FIG. 9B. The term "time-to-aperture area" curve used herein is a curve potting an area of a valve passage opened as a function of an angular position of the associated crank shaft with the axis of abscissas representing the angular position of the crank shaft while the axis of ordinates represents the area of valve aperture. Any valve having its operating characteristics represented by the curve shown in FIG. 9B cannot meet the requirement that the valve aperture should have an area large particularly on the first part of the valve-opening period in the aforesaid engine highly supercharged. An exhaust gas as spouted through such a valve from the associated engine cylinder on the first part of the valve-opening period is inevitably increased in loss.

Also, in order to compensate for such loss of the exhaust gas as spouted from the engine cylinder on the first part of the valve-opening period to supply a sufficient energy of the exhaust gas to an exhaust gas turbine and to provide the desired time-to-aperture area characteristics, it has already been proposed to choose a time point at which the exhaust valve starts to be opened sufficiently before the associated piston reaches its lower dead point. However, such an expedient compels merely to sacrifice a substantial portion of an expansion process of a combustion gas within a cylinder. Consequently, an internal combustion engine supercharged to a greater extent than that could be provided by the prior art practice is scarcely possible to be actually produced.

Further, in the conventional type of two-cycle diesel engines prevailingly used as marine engines there has been widely adopted a measure that, as shown in FIG. 12A, a cam shaft D1 is provided with a forward cam 02 and a rearward cam 02' adjacent thereto. Upon reversing the direction of the associated crank shaft (not shown), either of the cams 02 and 02' can be put in operating position by selective axial movement of the cam shaft 01 as shown by the double headed arrow in the same figure.

In such an engine, however, the higher both a number of rotation and an average effective pressure due to high supercharging the larger the total mass of a push rod 04, a valve to be operated and their associated components. This imposes severe requirements upon the cams 02 and 02' as well as portions disposed around the roller 03 in contact with either of the cams. These severe requirements are objectionable in that highly supercharged engines are difficult to be realized. Besides these significant disadvantages impeding the realization of highly supercharged engines, there are disadvantages such as a loud noise due to vibration of various members forming a valve operating device, easy break of a valve spring due to its vibration and occurrence of surge noise.

Accordingly, certain fluid pressure types of valve operating devices have been heretofore proposed for the purpose of eliminating the various disadvantages of the mechanical types of valve operating devices as above described. One of these fluid pressure types is illustrated in FIG. 11A and for controlling an exhaust valve 010, includes a plunger 011 disposed on a top of a valve stem of the valve 010 and having an operating surface to which fluid pressure is applied, a cam 012 controlled by a crank shaft (not shown), another plunger 013 adapted to be driven by the cam 012 and a fluid column 014 serving to operatively interconnect the plunger 011 with the plunger 013.

A second fluid pressure type of valve operating device is illustrated in FIG. 11B and similar to that shown in FIG. 11A except that a plunger 011 operatively connected to an exhaust valve 010 is subject to a fluid pressure originating from a reservoir 015 under control of a control valve 016 with the cam 012 and the associated members omitted.

However, in the direct fluid pressure system such as shown in FIG. 11A it will be apparent that the fluid column 014 substitutes merely the push rod 04 and the valve lever 05 in the mechanically operating device as previously described and that the operating fluid for the valve receives heat from the same continuously contacting a hot exhaust gas to increase in temperature. As a result, the operating fluid should be replaced by a cold fluid for each stroke or several strokes resulting in troublesome procedure. Further such a device include actually an oil used as the operating fluid so that gas bubbles contained in the oil are difficult to be extracted from the latter. Also, due to its relatively large mass, the plunger 013 imposes severe requirements upon design of the cam 012 and the end face portion of the plunger 013 for the similar reasons as previously described in conjunction with the mechanical type of valve operating devices. These requirements will be increasingly severe particularly in the case, dependent upon the direction of rotation of the crank shaft the cam shaft can be axially moved to select either one of two juxtaposed cams 02 and 02' for operation. Thus such a device will be inhibited to be realized.

On the other hand, the fluid pressure system using the control valve as illustrated in FIG. 11B is required to include the plunger 011 having a fluid pressure-bearing surface of sufficiently large area which a sufficiently high fluid pressure is exerted in order for the exhaust valve 010 to have a desired high speed at which the same is opened on a first part of its opening period. However, any rotary oil pump appears to practically provide a maximum possible pressure of the order of 200 kg./cm. Thus the desired high speed of the valve cannot be obtained unless the plunger 011 would have the fluid pressure-bearing surface sufficiently large. This results in the necessity of using the operating oil for each opening and closing stroke of the valve in a large amount corresponding to at least the product of the fluid pressure-bearing area of the plunger 011 multiplied by a valve lift, assuming that the valve is closed by the action of the associated spring rather than by the oil pressure. Such a large amount of the operating oil would be provided at the expense of a substantial portion of an output from an internal combustion engine used, for example, of from 10% to 20% thereof according to our calculation. For these reasons the special, highly supercharging results in no profit. Consequently, it will be considered that an internal combustion engine of highly supercharging type is hardly possible to be realized by having recourse to any of the devices as previously described.

The invention contemplates to make it possible to realize internal combustion engines supercharged highly as compared with the prior art engines by eliminating the aforesaid disadvantages of and objections to the mechanical type and fluid pressure type of valve operating devices previously known. A valve operating device according to the invention comprises a plunger connected to a valve stem of either an exhaust valve or an inlet valve for an internal combustion engine and having a relatively small fluid pressure-bearing area, a piston disposed coaxially to the plunger and having a fluid pressure-bearing area larger than that of the plunger, the piston having a length of its stroke smaller than that of the plunger, at least one pressure chamber for accommodating the plunger and the piston therein, a source of operating fluid under pressure, control valve means for introducing an operating fluid under pressure from the source into the pressure chamber in accordance with operation of the engine, and means for actuating either the piston or the same and the plunger by the operating fluid under pressure on a first part of a valve opening period to thereby open the valve and actuating only the plunger by the operating fluid under pressure on the latter part of the valve opening period until the valve is fully opened.

One of the features of the invention is the fact that the use of an operating fluid under pressure in an amount small as compared with the conventional fluid pressure type of valve operating devices can impart a desired high opening speed to a valve for an internal combustion engine and especially to an exhaust valve for a two-cycle internal combustion engine of supercharging type. More specifically, a fluid pressure serves to actuate either both the plunger having its small fluid pressure-bearing area and connected to the valve stem and the piston sufficiently larger in fluid pressure-bearing area than the plunger or the piston alone on a first part of the valve opening period whereby a speed at which the valve is open on the first part of the opening period can be greatly increased. Subsequently, on the latter part of the valve opening period the piston ceases to be actuated while only the plunger is continued to be actuated to thereby simultaneously accomplish both the maintenance of the valve opening speed and decrease in volume of the operating fluid under pressure.

As a result, a lift curve for the valve can be of rectangular shape and hence the time-to-aperture area be larger as desired. This permits an exhaust gas to be introduced from the engine cylinders into an exhaust gas turbine with a minimum possible loss of its energy. At the same time, that portion of an engine output necessary for producing the operating fluid under pressure can be greatly lower than that in the conventional fluid pressure type of valve operating devices. In this way, an internal combustion engine supercharged to a higher extent than that could be previously obtained has now been possible to be realized.

Further the invention permits the total mass of valve operating members to greatly decrease as compared with the mechanical type of valve operating devices as previously described, and hence the valve to have a high acceleration, with the result that a lift curve for the valve is of rectangular shape to allow the time-to-aperture area to be sufficiently large. Therefore, the invention is advantageous in that, for a given energy amount of an exhaust gas for driving an exhaust gas turbine, an expansion stroke of an internal combustion engine can be utilized up to a maximum possible length. In other words, the exhaust gas turbine can be driven without the associated engine compelled to have an excess of its expansion stroke resulting in improvement in thermal efficiency.

Also the invention has an advantage that, in operation, a loudness of noise generated around a valve unit can be greatly reduced because of a decrease in the total mass of valve operating members and of the facilitation of the provision of simple, effective fluid buffer means. In addition the invention eliminates the necessity of providing a spring for a valve for the reason that the operating fluid under pressure serves to effect both opening and closing the valve. This can effectively avoid noise due to the resonance of the spring and any failure due to its breaking.

As above pointed out, the device of the invention causes the associated valve to be opened at a high speed on a first part of its opening period by applying the fluid pressure to either or both the piston and the plunger or the piston or that first part of the period. In this connection it is to be noted that due to the inertia of the moving valve components, that high opening speed of the valve is without hindrance kept even at the latter part of the valve opening period during which only the plunger having its small fluid pressure-bearing area is operating while the piston has already halted. Thus it will be appreciated that the valve speed is kept at the desired high magnitude over the entirety of the valve opening period. In order to decrease the required amount of the operating fluid under high pressure to a valve as small as possible, the piston large in fluid pressure-bearing area has preferably a long stroke.

It is, therefore, to be understood that the terms "the first part" and "the latter part" of the valve opening period do not always mean respectively the first half and second half of the period obtained by exactly halving a stroke of a valve beginning at its fully closed position and terminating at its fully open position but that "the first part" may mean, for example, a first quarter of the entire stroke while the latter part means three quarters of the same following this first quarter.

In practicing the invention, an exhaust or inlet valve into which the same is to be incorporated as the case may advantageously include a valve stem formed, by itself, into the aforesaid plunger having the smaller pressure-bearing area. Then the aforesaid piston having the large fluid pressure-bearing area is fitted onto the plunger for relatively sliding movement with both components accommodated in a pressure chamber. It is to be noted that the plunger should be coupled in such unfixed relationship to the piston that, on the first part of the opening stroke for the valve or through a distance from the fully closed position of the valve to an intermediate position of a valve lift, for example, during a first quarter of the stroke, both the plunger and the piston are displaced as a unitary unit in a valve opening direction and that thereafter the piston ceases to be displaced whereas only the plunger is subjected to a fluid pressure within the pressure chamber to be further moved until the valve is fully opened.

In one embodiment of the invention, a valve stem may be provided with a second piston portion rigidly secured thereto whose diameter is larger than that of a plunger but smaller than that of the first-mentioned piston. Then an extension of the valve stem positioned above the second piston portion fitted into the aforesaid piston (which is referred to, hereinafter, as a first piston) for relatively sliding movement and serves as a plunger. The first piston is disposed within a pressure chamber where the same is permitted to be displaced through a distance corresponding a predetermined length of the stroke such as one quarter of the valve lift. In this case the second piston formed on the valve stem can serve as the main part of a valve closing device of fluid pressure type by having a second pressure chamber below the first pressure chamber including the second piston fitted therein and adapted to be fed with a fluid under high pressure upon closing the valve. In addition, the second piston can be adapted to abut at its lower end against the bottom surface of the second pressure chamber when the valve is being opened. In this way, the second piston also is effective for serving as a stop for limiting displacement of the plunger in the direction to open the valve.

As previously described, the exhaust valve as opened has predominantly a greater effect upon the effective supply of the exhaust gas from the engine cylinders to the associated exhaust gas turbine than the same as closed. (It will be appreciated that, even if a flow of scavenging air would supply some energy of the exhaust gas to the exhaust gas turbine its effect is very low as compared with an energy supplied to the exhaust gas turbine by a hot exhaust gas under high pressure spouted from the associated cylinder on the first part of the valve opening period.) For this reason the valve operating device of the invention is not always required to comprise the valve closing device of fluid pressure type including the second piston and the second pressure chamber as above described. If desired, any suitable spring may be used to close the valve. In the latter case, the second piston may merely serve as a member for transferring the operation of the first piston to the valve stem and also as a position determining member cooperating with other control member or members for determining the valve lift to define the fully open position of the valve.

In another embodiment of the invention, a valve may include an extension of a valve stem or a plunger provided at its free end with a protrusion of reduced diameter adapted to be fitted into a small buffer space disposed at the top of the pressure chamber as previously described and communicating with the surrounding atmosphere through a vent opening of extremely small size. This arrangement provides simple, effective hydraulic buffer and degassing means. The hydraulic buffer means are effective for preventing the valve from crashing into its seat upon closing the valve and hence for preventing both any damage to the valve and valve seat and the generation of noise. On the other hand the degassing means are effective to remove a gas or gases inevitably mingled with an operating oil under pressure, if used, from the same to thereby ensure that the valve is reliably operated with the oil pressure.

As the operating fluid under pressure, any suitable oil under pressure may be most advantageously used with the invention. It is however, to be noted that for a low speed internal combustion engine driven for example, a rate less than 120 r.p.m. a compressed air under high pressure may be used as an operating fluid. Since air has a very high compressibility as compared with an oil it is not suitable for use with an internal combustion engine rotating at a high speed because of delay in operation. However, air is advantageous in that the cost of the same is not necessary to be taken into account, and that air after having operated can be discharged to the atmosphere resulting in elimination of any return air line leading to simplification of construction and so on. Thus air has a charming utility as an operating fluid for operating a valve associated with a low speed internal combustion engine.

It is to be understood that, in order to control feeding of an operating fluid into a pressure chamber such as previously described at a predetermined interval of time dependent upon rotational movement of a crank shaft for an internal combustion engine any suitable piston valve of conventional construction or the like may be conveniently used. In general, such a control valve can be operated by a cam mounted on a cam shaft driven by the crank shaft and has its mass very small as compared with the mass of a cam follower used with the conventional mechanical type of valve operating device or with the direct fluid pressure system illustrated in FIG. 11A. Thus the use of such a control valve does not lead to generation of any excessive stress or impact on the cam and a roller in contact with the same or on their contact surfaces. Also in the case of a pair of cams mounted in different phases on a cam shaft are selected to be put in operation by axial displacement of the cam shaft for the purpose of accommodating the same to the direction of rotation of the motor, the cam and roller in contact with the same can be designed without difficulty because of a low mass of a control valve used.

In a still further embodiment of the invention a valve stem for a valve controlled by the same way include a a top portion formed into a plunger having a small fluid pressure-bearing area and a piston having a large fluid pressure-bearing area may be disposed coaxially to and above the plunger in such a manner that, when the valve is in its closed position the lower end of the piston contacts the upper end surface of the plunger. With this arrangement the piston may be preferably provided therein with an oil passage in order to introduce an operating fluid under high pressure on the upper fluid pressure-bearing surface of the piston through the interior thereof as well as on the upper fluid pressure-bearing surface of the plunger contacting the lower end of the piston. Further, the piston is accommodated in a pressure chamber such that the same is allowed to only run its short stroke corresponding to a fraction of a valve lift. In operation when the operating fluid under pressure is fed into the pressure chamber the valve is opened at a high speed on the first part of the opening period by the fluid pressure acting upon both the piston and the plunger, and then the piston ceases to be moved. Thereafter, the valve is continued to be opened at the high speed by the fluid pressure acting on the plunger alone until it is fully opened.

If desired, the fluid passage extending through the interior of the piston to the fluid pressure-bearing surface at the top of the plunger may be omitted and instead a modification may be made wherein the operating fluid will be supplied to the fluid pressure-bearing surface of the plunger through in any suitable manner just at the moment the piston will have been moved through a predetermined distance corresponding to a fraction of the valve lift. In such a modification it will be seen that only the piston having the large fluid pressure-bearing surface is first operated to initiate opening of the associated valve and that then the piston ceases to be moved whereupon the operating fluid is now applied to the fluid pressure-bearing surface of the plunger. This application of the operating fluid causes movement of the plunger alone until the valve is fully opened.

In either of the two last-mentioned arrangements the buffer and gas degassing means as above described are necessarily disposed between the piston and the pressure chamber in which the piston is accommodated because the plunger does not extend through the piston. It is, however, to be understood that each of these arrangements is not substantially different in operation and result from the embodiments of the invention as previously described and is especially suitable for use with an internal combustion engine supercharged to a higher extent than that would be previously possible.

Referring now to the drawings and more particularly to FIGS. 1 to 7 inclusive, there is illustrated one form of a valve operating device constructed in accordance with the teachings of the invention. As shown in FIG. 1, a cover member 1 for a two-cycle diesel engine (not shown) is provided with a rod 2 slidably extending therethrough with a guiding sheath 3 inserted therebetween. The rod 2 serves as a valve stem for an exhaust valve 4 operative to connect and disconnect a fluid passage 5 disposed within the cover member 1, to and from the interior of the diesel engine respectively. A hydraulic cylinder 6 such as an oil pressure cylinder disposed on the cover member 1 surrounds coaxially the valve stem 2 and comprises a pair of first and second pressure chambers 7 and 8 disposed one above the other and separated by a partition 9. The first and second pressure chambers 7 and 8 include respectively the fluid ports 10 and 11 permitting an operating fluid under pressure to be introduced into and discharged from the pressure chambers and a plunger 12 movably extending therethrough. This plunger is formed of extension of the valve stem 2 and includes its upper end surface providing a fluid pressure-bearing surface. The first or upper pressure chamber 7 is provided at its top with a cylindrical hydraulic buffer space of very reduced diameter 13 and communicating with the surrounding atmosphere through a vertical vent opening 14.

The plunger 12 is provided on its upper end surface with a protrusion of reduced diameter 15 adapted to be fitted into the hydraulic buffer space 13 and including a needle rod of further reduced diameter 16 formed on its upper end portion.

A first hollow piston 17 is movably disposed within the first pressure chamber 7 and slidably fitted onto the plunger 12. The first piston 17 includes a fluid pressure-bearing surface of large area formed on its upper end surface and a plurality of fluid passages 18 in the form of a hole (FIG. 2) longitudinally extending therethrough. Disposed below the first piston 17 and within the second pressure chamber 8 is a second hollow piston 19 having a fluid pressure-bearing surface of large area. The second piston 19 is fitted onto the plunger 12 against relative axial movement and provided with a plurality of fluid passages 20 in the form of a groove (FIG. 3) extending through the outer periphery of the lower portion. The second pressure chamber 8 also includes on its lower end a buffer member of any suitable material 21.

As shown in FIG. 1 a control valve device generally designated at the reference numeral 22 comprises a pair of fluid ports 23 and 24 connected to the fluid ports 10 and 11 respectively as schematically illustrated by dotted and dashed lines, a feed fluid port 25 normally communicating with a source of operating fluid under pressure such as an oil reservoir (not shown) to feed an operating fluid or oil under pressure into the control valve device 22 therethrough a pair of discharge fluid ports 26 and 27 normally communicating with a fluid collector tank (not shown) to discharge the fluid from the control valve device into the fluid collection tank therethrough, and a piston valve 28 operative to selectively connect the feed fluid port 25 to one of fluid ports 23 or 24 while connecting the other fluid port to either the discharge port 26 or the discharge port 27. The piston valve 28 includes a roller 29 rotatably carried by its lower end. The roller 29 engages a cam 30 mounted on a cam shaft 31 adapted to be driven by a crank shaft (not shown).

The valve operating device thus far described is operated as follows:

In operation, a crank shaft (not shown) drives the cam shaft 31 which, in turn, drives the cam 30. Rotational movement of the cam 30 causes reciprocal movement of the piston valve 28 through the roller 29. It is assumed that the components are in their respective positions as illustrated in FIG. 1. The piston valve 28 is in its lowered position where the feed fluid port 25 communicates with the fluid port 24 permitting the oil under pressure to be fed into the second pressure chamber 8 through the fluid port 11 connected to the port 24. Thus the oil pressure acting on the lower surface of the second piston 8 causes the exhaust valve 4 to seat on its valve seat to fully close the valve. On the other hand, the discharge fluid port 26 of the control valve device 22 communicates with the fluid port 23 which, in turn, communicates with the first pressure chamber 7 through the fluid port 10. In other words, the first pressure chamber 7 communicates with the fluid collection tank (not shown). This prevents the first piston 17 from being subject to oil pressure.

Now assuming that the cam shaft 31 is rotated from its position as illustrated in FIG. 1 in the direction of the arrow as shown in the same figure, the piston valve is upwardly moved by the rotation of the cam 30. The upward movement of the piston valve causes first closing of the fluid port 23 and 24 and subsequently communication of the fluid port 23 and 24 with the feed and discharge fluid ports 26 and 27 respectively. Thus the control valve device 22 will assume its position as illustrated in FIG. 6A. This permits the oil under pressure to flow into the first pressure chamber 7 through its fluid port 10 and the oil in the second pressure chamber 8 to return to the oil collection tank through the fluid port 11. As a result, the valve 4 or the valve stem 2 starts to rapidly descend at a high acceleration by the action of oil pressure acting upon both the first piston 7 having a large fluid pressure-bearing area and the plunger 12 or the extension of the valve stem having a small fluid pressure-bearing area.

After the valve 4 has been moved through a distance corresponding to a predetermined fractional of its lift L in this case approximately 27% thereof the first piston 17 abuts agains the lower wall of the first pressure chamber 7 to cease to be moved, whereupon the valve 4 is put in its position as illustrated in FIG. 6B. After the first piston 7 has halted the oil pressure in the first pressure chamber 7 acts only upon the plunger 12 to move the same downwardly with the result that the valve moves its entire stroke to be fully opened.

It is noted that, during the opening movement of the exhaust valve 4 as just described the valve stem 2 has already a high speed on the first part of the valve opening period for the reason that the oil pressure has acted upon both the piston 17 and the plunger 12 having as a whole the large total of the fluid pressure-bearing areas. Thus although the first piston 17 ceased to be moved after it moved a distance corresponding to the fractional lift 1 and thereafter the oil pressure is acting only on the plunger 12 having the small fluid pressure-bearing area. This ensures that the valve stem 2 is continued to move a distance corresponding to the remaining lift, at the similar high speed. Consequently the lower end surface of the second piston 19 strikes on the buffer member 21 disposed at the lower end of the second pressure chamber 8. At that time, the valve operating device will assume its position as illustrated in FIG. 6C where the valve is fully opened.

Just before the valve 4 reaches its fully open position the protrusion 15 on the top of the plunger 12 disengages from the buffer space 13 on the top of the first pressure chamber 7 whereby a minute annular clearance $\delta$ is formed between the free end of the protrusion 15 and the entrance of buffer space 13. The now formed clearance $\delta$ permits any gas contained in the pressurized operating oil within the first pressure chamber 7 to enter the buffer space 13 through the clearance $\delta$ and thence to the atmosphere through the vent opening 14. At that time the oil under pressure may partly escape from the first pressure chamber 7 in the buffer space 13 along with the gas contained. This partial escapement of the oil is not actually objectionable to the operation of the present device because the valve now reaches a position immediately before its fully open position and provided that the clearance $\delta$ is made sufficiently small.

When the cam 30 is continued to be further rotated in the direction of the arrow illustrated in FIG. 1, the piston valve 28 of the control valve device 22 again descends to communicate the feed fluid port 25 with the fluid port 24 and also to communicate the discharge fluid port 26 with the fluid port 23. Accordingly, the oil under pressure begins to flow into the second pressure chamber 8 whereas the oil under pressure in the first pressure chamber 7 begins to flow into the oil collection tank as will be understood from the previous description. This is illustrated in FIG. 7A. Under these circumstances, the valve 4 starts to be closed by the action of the oil pressure acting on the second piston 19. Then the valve 4 reaches through its position as illustrated in FIG. 7B to its position as illustrated in FIG. 7C, whereupon the same seats on its valve seat to be fully closed.

During the closing movement of the valve 4 as above described, the protrusion 15 on the plunger 12 enters the buffer space 13 to force the oil out from the space through the vent opening 14 to the exterior until the needle rod 16 is fully fitted into the vent opening 14. Thus there is nothing for the oil within the buffer space 13 to leak through fit clearances between the needle rod 16 and the vent opening 14, and between the protrusion 15 and the buffer space 13 into the exterior and the first pressure chamber 7 respectively. Therefore it will be appreciated that any impact occurring upon seating the valve 4 on its valve seat can be very effectively alleviated by properly selecting the dimensions of those fit clearances.

Referring now to FIG. 8 wherein like reference numerals designate similar parts, there is illustrated another form of a valve operating device according to the invention. The main difference between an arrangement shown in FIG. 8 and the arrangement as previously described in connection with FIGS. 1 to 7 inclusive is that, instead of the separate plunger and second piston, a valve stem 2 of an exhaust valve 4 includes its extension 50 providing a plunger and a second piston integral with the plunger and that a first piston 51 is provided with a plurality of fluid passages 52 extending upwardly through the same and opening at a first pressure chamber 7 and a fluid passage or passages 53 extending downwardly therethrough and adapted to feed an operating fluid under pressure or a pressurized oil on the fluid pressure-bearing surface of the plunger 50 therethrough. As in the previous case, the first piston 51 is provided at its top with a protrusion 54 including a needle rod 55 formed on the upper end. Other respects are substantially similar as in the previous case and need not be further described.

The arrangement of FIG. 8 is operated in the substantially same manner as that previously described in conjunction with FIGS. 1 to 7 inclusive. In brief, as a control valve device such as previously described is operated to introduce an oil under pressure into a fluid port 10, one portion of the introduced oil is passed through the fluid pasages 52 to the first pressure chamber 7 to thereby move the first piston 51 downwardly. At the same time, the remaining portion of the oil under pressure reaches the top surface of the plunger 50 through the downward fluid passage 53 to thereby move the plunger downwardly. As a result, the valve 4 starts to be opened at a rapid speed by the action of the resultant thrust acting upon the first piston 51 and the plunger 50. Then the first piston 51 ceases to be moved and thereafter the oil pressure is continued to act upon the plunger 50 alone to maintain the valve at its high speed until the valve is fully opened.

Further as the control valve device is operated to connect a fluid port 11 to a source of oil under pressure (not shown) an oil under pressure is introduced from the source into a second pressure chamber 8 to exert an upward thrust on the plunger resulting in closing of the valve.

It will be readily understood that, as in the previous embodiment the protrusion 54 and the needle rod 55 are effective for degassing the operating oil within the first pressure chamber 7 during the opening movement of the valve and for smoothly seating the valve 4 upon closing the same.

It is to be understood that the arrangement illustated in FIG. 8 may be variously modified without departing from the spirit and scope of the invention. For example, instead of the fluid passage 53 in the first piston 51 a fluid port designated by dotted line 56 in FIG. 8 may be formed on a side wall of a hydraulic cylinder at such a level that the oil under pressure is permitted to be introduced on the top surface of the plunger 50 just after the completion of the first piston's stroke. In this case, as the oil under pressure is fed into the first pressure chamber 7 through the fluid port 10 upon opening the valve only the first piston 51 having a large fluid pressure-bearing area is actuated to move the plunger 50 downwardly to thereby open the valve 4 at a high speed and then the piston 51 is halted. After the first piston 51 has been halted the oil under pressure is supplied through the fluid port 56 to the plunger 50 on its pressure-bearing surface of small area until the valve 4 is fully opened while maintaining its high opening speed initially imparted.

From the foregoing it will be appreciated that the valve operating device of the invention is operative to open the associated valve in such a manner that, on the first part of a valve operating period an operating fluid under high pressure acts on either a piston having a large fluid pressure-bearing area but a very smaller stroke than a valve lift for the valve or both the piston and a plunger smaller in fluid pressure-bearing area than the same to move it or them at a high speed and thereafter the piston having the large fluid pressure-bearing area ceases to be moved whereas the fluid under high pressure acts only on the plunger having the smaller pressure-bearing area until the valve is fully opened while maintaining the high opening speed. As a result, a lift curve for the valve can be of rectangular shape. In other words, the valve will have the time-to-aperture area characteristics such as shown in FIG. 10.

It will be readily understood that a time-to-aperture area curve of such rectangular shape permits an exhaust gas to be supplied in the required amount of its energy from the associated cylinder to an exhaust gas turbine with a minimum loss of energy of the gas as exhausted by the cylinder. Also, by making the stroke of the plunger having the large fluid pressure-bearing area as small as possible, the invention can greatly reduce a quantity of the operating fluid under high pressure consumed to operate the valve as compared with the conventional fluid pressure type of valve operating devices, assuming that the valve is operated at the same speed. For example, the results of our calculations conducted with marine two-cycle diesel engine indicated that the conventional fluid type of valve operating device as shown in FIG. 11B disadvantageously consumed approximately 10 to 20% of an engine output to produce a quantity of operating fluid under high pressure necessary for imparting a desired speed to the associated valve whereas the present device was required only to consume the order of 3% of the engine output.

Also from the foregoing it will be readily appreciated that the invention has provided a valve operating device very simple in constructions, compact, small-sized and light in weight as compared with the conventional mechanical type of valve operating devices having substantially the equal performance. As an example FIG. 12 illustrates a comparison of the present device with such a device in terms of dimension. FIG. 12A illustrates a conventional device for mechanically operating a valve and FIG. 12B the device of the invention. Thus it will be recognized that the adoption of the invention results in various components of an internal combustion engine very simple in construction, and reduced in weight and dimension.

As previously pointed out, the invention obviates the necessity of using a spring in a valve. This leads to elimination of noise due to the resonance of such a spring and of breakage of the same. Further, due to the absence of the valve spring various members composing the valve operating device do not at all contact each other in impact fashion unlike the mechanical type of valve operating devices. Therefore, the invention is advantageous in that an internal combustion engine incorporating the same can be operated smoothly and quietly. This advantage is enhanced by the provision of hydraulic buffer means as previously described.

It is here recalled that, in order to realize an internal combustion engine of highly supercharging type, the opening process of a valve and more particularly of an exhaust valve is the more important factor than the closing process thereof. Therefore it is not necessarily required to close the valve by the action of the fluid pressure as in the previously described embodiments of the invention. The resiliency of a spring may be equally utilized to close the valve. In the latter case, there is another advantage that closing of the valve is not accompanied by consumption of the operating fluid in high pressure.

The invention is equally applicable to an internal combustion engine adapted to change its direction of rotation by mounting a pair of differently phased cams on a cam shaft driven by a crank shaft for the engine and axially displacing the cam shaft to selectively operate one of the cams. As shown in FIG. 12B, a cam shaft 31 adapted to be driven by a crank shaft (not shown) is provided with a pair of cams 30 and 30' with different phases. The shaft 31 is arranged to be axially displaced to select one of the cams to operate the same. Other respects are similar as in the embodiments of the invention as previously described. As will be seen in FIG. 12B invention is advantageous in that any high speed, supercharging internal combustion engine can be designed without difficulty because components driven by the cams are very small in mass.

The invention has been described in terms of an exhaust valve used with an internal combustion engine. However, it is to be understood that the invention is equally applicable to an inlet valve or the like used with the engine.

While the invention has been described in conjunction with certain embodiments thereof it is to be understood that numerous changes in the detail of the construction and the arrangement and combinations of parts may be made without departing from the spirit and scope of the invention. For example, as shown in FIG. 4, the control valve device may be driven by a solenoid 32 rather than by the cam.

What we claim is:

1. In a valve-operating device for operating a valve on an internal combustion engine to a seated position and an unseated position, said valve having a stem, means in said device for rapidly seating and unseating said valve comprising, a reciprocable plunger operably connected to said valve stem and actuatable longitudinally through an operating stroke having a given length, a first piston and a second piston disposed for mutually actuating each other through a given portion of the stroke of said plunger corresponding to the full length of an operating stroke of said first piston and disposed coaxially with said plunger, means operably connecting said second piston to said plunger for actuating said plunger, said plunger being movable relatively to said first piston, means in said device defining cylinder means in which said first and second pistons and plunger are mounted for reciprocation, comprising means to limit said operating stroke of said first piston to a length less than the given length of said operating stroke of said plunger and means to limit an operating stroke length of said second piston to the operating stroke length of said plunger, said plunger having an area to which fluid under pressure is applied for actuating it during travel along the full given length of its stroke in one direction, said first piston having an area to which fluid under pressure is applied for actuating said first piston in said one direction and thereby actuating said second piston by said first piston, said area of said first piston being greater than said area of said plunger, said second piston having an area to which fluid is applied under pressure to actuate said second piston in a direction opposite to said one direction the full given length of said stroke of said plunger thereby to actuate said plunger and said first piston the full given stroke length of said plunger and said limited stroke length of said first piston respectively in said opposite direction, and means to apply fluid under pressure to said area of said first piston and said area of said plunger, throughout the stroke of said plunger in said one direction for actuation thereof simultaneously and jointly and for applying fluid under pressure alternately to said area on said second piston to reciprocate said plunger thereby to unseat and seat said valve.

2. In a valve operating-device for operating a valve on an internal combustion engine to a seated position and an unseated position, said valve having a stem, means in said device for rapidly seating and unseating said valve comprising, a reciprocable plunger operably connected to said valve stem and actuatable longitudinally through an operating stroke having a given length, a first piston and a second piston disposed for mutually actuating each other through a given portion of the stroke of said plunger corresponding to the full length of an operating stroke of said first piston and disposed coaxially with said plunger, means operably connecting said second piston to said plunger for actuating said plunger, said plunger being movable relative to said first piston, means in said device defining cylinder means in which said first and second pistons and plunger are mounted for reciprocation comprising means to limit said operating stroke of said first piston to a length less than the given length of said operating stroke of said plunger and means to limit an operating stroke length of said second piston to the operating stroke length of said plunger, said plunger having an area to which fluid under pressure is applied for actuating it during travel along the full given length of its stroke in one direction, said first piston being disposed circumferentially of said plunger and having an area to which fluid under pressure is applied for actuating said first piston in said one direction and thereby actuating said second piston by said first piston, said area of said first piston being greater than said area of said plunger, said second piston having an area to which fluid is applied under pressure to actuate said second piston in a direction opposite to said one direction the full given length of said stroke of said plunger thereby to actuate said plunger and said first piston the full given stroke length of said plunger and said limited stroke length of said first piston respectively in said opposite direction, and means to apply in operation fluid under pressure to said area of said first piston and said area of said plunger during the full given length of said stroke of said plunger in said one direction for actuation of said first piston and said plunger simultaneously in said one direction and alternately to said area on said second piston to reciprocate said plunger thereby to unseat and seat said valve.

3. In a valve-operating device according to claim 2, cushioning means in said cylinder means to cushion said first piston and said valve at the end of their stroke in said opposite direction.

4. In a valve-operating device according to claim 3, said cylinder means comprising a main bore in which said pistons reciprocate and in which said cushioning means comprises, means defining an open-end bore of reduced diameter communicating with said main bore, and including an extension on said plunger on one end thereof reciprocable into and out of said open-end bore, said first piston including means to receive said fluid in communication with said area and said open-end bore for decelerating said plunger, whereby as fluid flows outwardly of said open-end bore when said plunger is actuated in said opposite direction and said extension enters said open-end bore it functions to throttle the fluid flowing out said open-end bore thereby decelerating said plunger.

5. In a valve-operating device according to claim 2, said area of said first piston and said area of said plunger jointly comprising an effective area under pressure when said fluid under pressure is applied for actuation in said one direction.

References Cited by the Examiner
UNITED STATES PATENTS

| | | | |
|---|---|---|---|
| 885,459 | 4/08 | Engler et al. | 123—90 |
| 2,396,052 | 3/46 | Light | 123—90 |
| 2,827,884 | 3/58 | Stivender | 123—90 |

FRED E. ENGELTHALER, *Primary Examiner.*